US012771198B2

(12) United States Patent
Micucci et al.

(10) Patent No.: US 12,771,198 B2
(45) Date of Patent: Oct. 20, 2026

(54) STATOR OR ROTOR WINDING WITH HIGH CONFIGURABILITY, AND STATOR OR ROTOR USING SUCH A WINDING

(71) Applicant: Tecnomatic S.p.A., Corropoli (IT)

(72) Inventors: Maurilio Micucci, Corropoli (IT); Stefano Di Marcantonio, Corropoli (IT); Giuseppe Ranalli, Corropoli (IT)

(73) Assignee: TECNOMATIC S.P.A., Corropoli (IT)

( * ) Notice: Subject to any disclaimer, the term of this patent is extended or adjusted under 35 U.S.C. 154(b) by 157 days.

(21) Appl. No.: 18/849,808

(22) PCT Filed: Nov. 21, 2023

(86) PCT No.: PCT/IB2023/061742
§ 371 (c)(1),
(2) Date: Sep. 23, 2024

(87) PCT Pub. No.: WO2024/184693
PCT Pub. Date: Sep. 12, 2024

(65) Prior Publication Data

US 2025/0226715 A1 Jul. 10, 2025

(30) Foreign Application Priority Data

Mar. 7, 2023 (IT) ........................ 102023000004140

(51) Int. Cl.
*H02K 3/28* (2006.01)
*H02K 3/12* (2006.01)

(52) U.S. Cl.
CPC ................. *H02K 3/28* (2013.01); *H02K 3/12* (2013.01)

(58) Field of Classification Search
CPC ......... H02K 3/12; H02K 3/28; H02K 2203/06
See application file for complete search history.

(56) References Cited

U.S. PATENT DOCUMENTS

| | | | | |
|---|---|---|---|---|
| 3,837,072 | A | 9/1974 | Moberg | |
| 6,894,417 | B2 * | 5/2005 | Cai | H02K 3/12 310/201 |
| 7,480,987 | B1 | 1/2009 | Guercioni | |
| 8,552,611 | B2 | 10/2013 | Matsuoka et al. | |
| 10,749,399 | B2 | 8/2020 | Riedl et al. | |
| 2009/0178270 | A1 | 7/2009 | Guercioni | |

(Continued)

FOREIGN PATENT DOCUMENTS

| | | | |
|---|---|---|---|
| CN | 114389393 | A | 4/2022 |
| DE | 102019218115 | A1 | 5/2021 |
| EP | 4138269 | A1 | 2/2023 |

OTHER PUBLICATIONS

International Search Report for International Patent Application No. PCT/IB2023/061742, mailed Mar. 20, 2024.

*Primary Examiner* — Tulsidas C Patel
*Assistant Examiner* — Robert E Mates
(74) *Attorney, Agent, or Firm* — Armstrong Teasdale LLP

(57) ABSTRACT

A polyphase stator or rotor winding with high configurability is provided. A stator or rotor using the polyphase stator or rotor winding with high configurability, where single-layer hairpins having different pitches so as to differ at least by two positions in the slot is also provided. Such an arrangement allows obtaining a wider family of windings and electrically balanced stators or rotors, maintaining the diameter at the air gap, the number of slots, and the dimensions of the conductor.

12 Claims, 14 Drawing Sheets

(56) References Cited

U.S. PATENT DOCUMENTS

| | | | | |
|---|---|---|---|---|
| 2009/0302705 | A1 | 12/2009 | Guercioni | |
| 2014/0319953 | A1* | 10/2014 | Rahman | H02K 3/04<br>310/201 |
| 2018/0048203 | A1* | 2/2018 | Ohguchi | H02K 3/345 |
| 2020/0014267 | A1* | 1/2020 | Rahman | H02K 3/28 |
| 2022/0320934 | A1* | 10/2022 | Shi | H02K 3/28 |
| 2022/0344994 | A1* | 10/2022 | Chuang | H02K 3/28 |

* cited by examiner

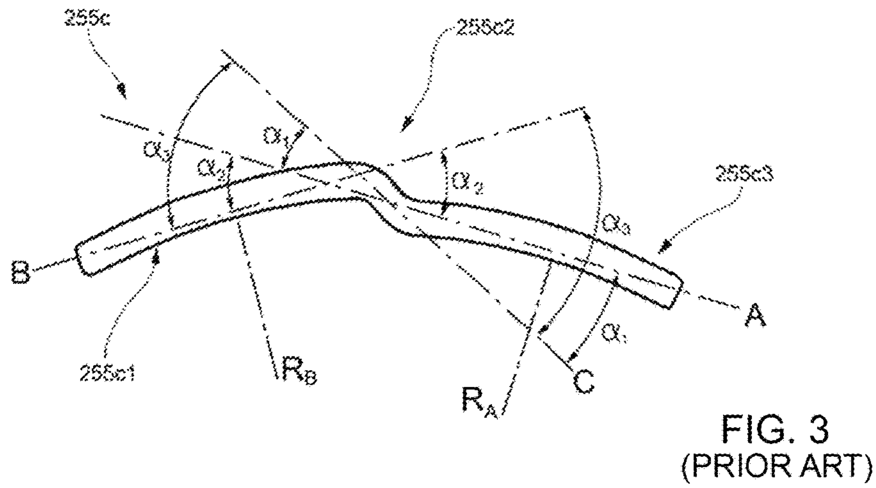
FIG. 3
(PRIOR ART)
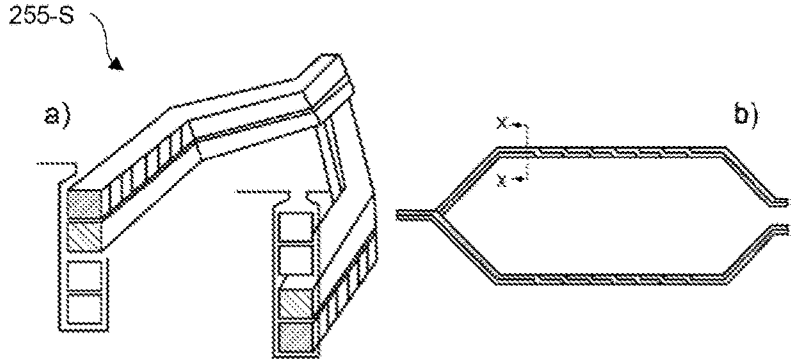
FIG. 4A
(PRIOR ART)
FIG. 4B
(PRIOR ART)
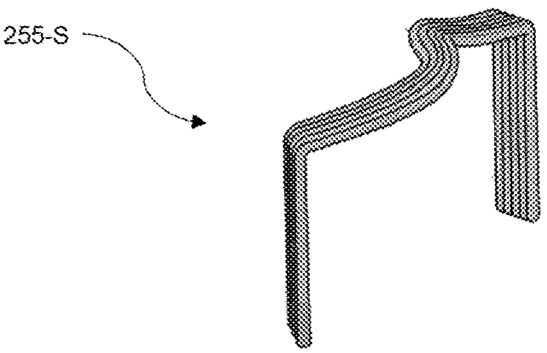
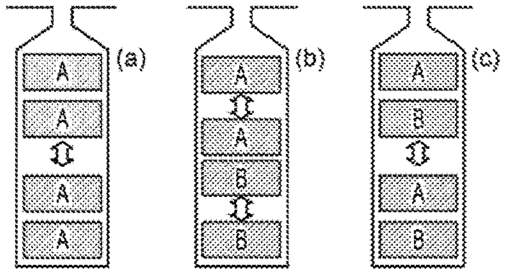
FIG. 4C
(PRIOR ART)

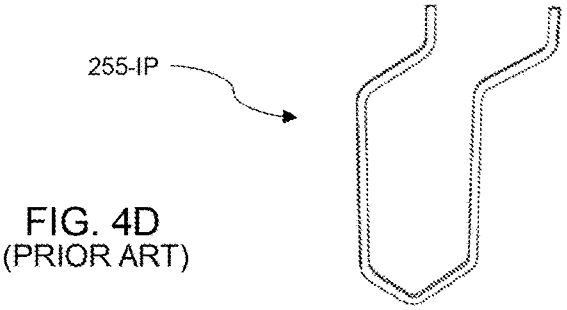
FIG. 4D
(PRIOR ART)
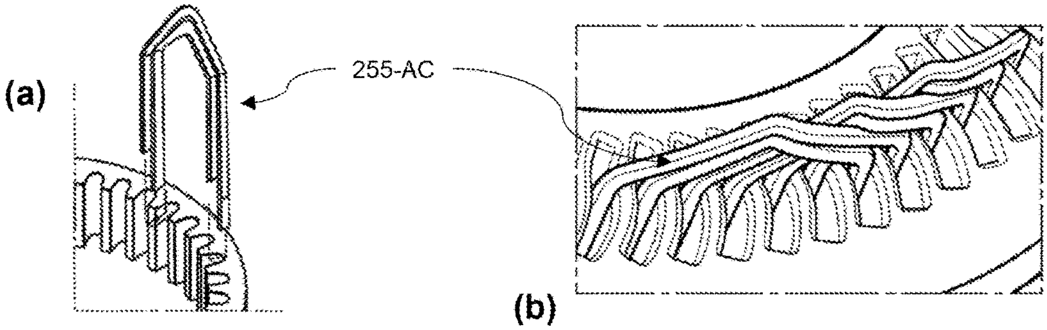
FIG. 4E
(PRIOR ART)
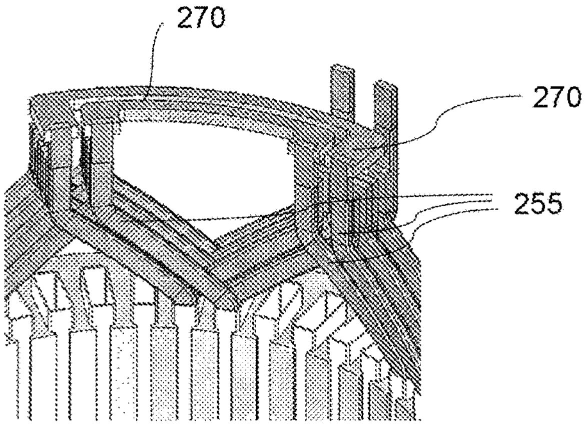
FIG. 4F
(PRIOR ART)
FIG. 5
(PRIOR ART)
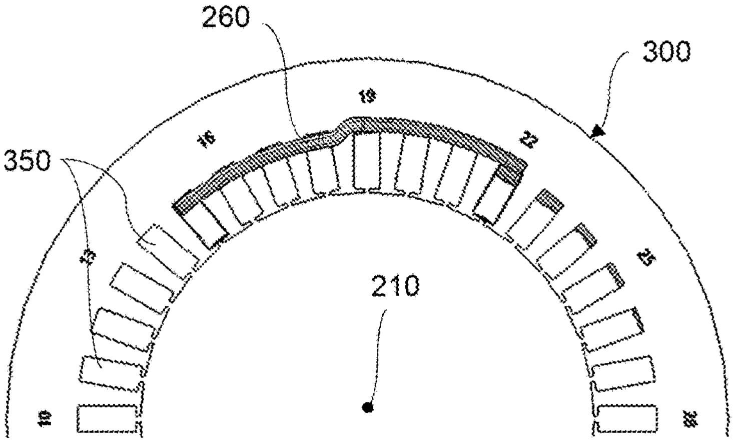

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Layer 1 | U+ | U+ | W- | W- | V+ | V+ | U- | U- | W+ | W+ | V- | V- | U+ | U+ | W- | W- | V+ | V+ | U- | U- | W+ | W+ | V- | V- |
| Layer 2 | U+ | U+ | W- | W- | V+ | V+ | U- | U- | W+ | W+ | V- | V- | U+ | U+ | W- | W- | V+ | V+ | U- | U- | W+ | W+ | V- | V- |
| Layer 3 | U+ | U+ | W- | W- | V+ | V+ | U- | U- | W+ | W+ | V- | V- | U+ | U+ | W- | W- | V+ | V+ | U- | U- | W+ | W+ | V- | V- |
| Layer 4 | U+ | U+ | W- | W- | V+ | V+ | U- | U- | W+ | W+ | V- | V- | U+ | U+ | W- | W- | V+ | V+ | U- | U- | W+ | W+ | V- | V- |

(a)

(b)

Slot – Bottom

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Layer 1 | A1 | | | | | | | | | | | | A3 | | | | | | | | | | | |
| Layer 2 | | | | | | | A2 | | | | | | | | | | | | A4 | | | | | |
| Layer 3 | | | | | | | | | | | | | | | | | | | | | | | | |
| Layer 4 | | | | | | | | | | | | | | | | | | | | | | | | |

Slot – Opening (a)

(b)

Single-layer hairpin

Slot – Bottom

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 1 | 2 |
|---|---|---|---|---|---|---|---|---|---|---|---|---|---|---|---|---|---|---|---|---|---|---|---|---|---|---|
| Layer 1 | B8 | C8 | | | | | A7 | B7 | | | | | D8 | A8 | | | | | C7 | D7 | | | | | B8 | C8 |
| Layer 2 | C6 | D6 | | | | | A1 | B1 | | | | | A6 | B6 | | | | | C1 | D1 | | | | | C6 | D6 |
| Layer 3 | C2 | D2 | | | | | C5 | D5 | | | | | A2 | B2 | | | | | A5 | B5 | | | | | C2 | D2 |
| Layer 4 | A4 | B4 | | | | | C3 | D3 | | | | | C4 | D4 | | | | | A3 | B3 | | | | | A4 | B4 |

Slot – Opening

Single-layer hairpin

| Phase U | Phase V | PhaseW |
|---|---|---|

FIG. 11 (PRIOR ART)

Single-layer hairpin

Slot – Bottom

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 1 | 2 |
|---|---|---|---|---|---|---|---|---|---|---|---|---|---|---|---|---|---|---|---|---|---|---|---|---|---|---|
| Layer 1 | | A8 | | | | | A7 | | | | | | | | | | | | | | | | | | | |
| Layer 2 | | | | | | | A1 | | | | | | A6 | | | | | | | | | | | | | |
| Layer 3 | | | | | | | | | | | | | A2 | | | | | | A5 | | | | | | | |
| Layer 4 | A4 | | | | | | | | | | | | | | | | | | A3 | | | | | | A4 | |

Slot – Opening

Single-layer hairpin

| Phase U | Phase V | PhaseW |
|---|---|---|

FIG. 12 (PRIOR ART)

Single-layer hairpin

Slot – Bottom

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 1 | 2 |
|---|---|---|---|---|---|---|---|---|---|---|---|---|---|---|---|---|---|---|---|---|---|---|---|---|---|---|
| Layer 1 | D8 | A8 | | | | | A7 | B7 | | | | | B8 | C8 | | | | | C7 | D7 | | | | | D8 | A8 |
| Layer 2 | C6 | D6 | | | | | A1 | B1 | | | | | A6 | B6 | | | | | C1 | D1 | | | | | C6 | D6 |
| Layer 3 | C2 | D2 | | | | | C5 | D5 | | | | | A2 | B2 | | | | | A5 | B5 | | | | | C2 | D2 |
| Layer 4 | A4 | B4 | | | | | C3 | D3 | | | | | C4 | D4 | | | | | A3 | B3 | | | | | A4 | B4 |

Slot – Opening

Single-layer hairpin

| Phase U | Phase V | PhaseW |
|---|---|---|

FIG. 13 (PRIOR ART)

Slot - Bottom

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| Layer 1 | B15 | C15 | | | | | E16 | B16 | | | | | D15 | E15 | | | | | G16 | D16 | | | | | F15 | G15 | | | | | I16 | F16 | | | | |
| Layer 2 | A1 | B1 | | | | | B14 | C14 | | | | | C1 | D1 | | | | | D14 | E14 | | | | | E1 | F1 | | | | | F14 | G14 | | | | |
| Layer 3 | N13 | A13 | | | | | A2 | B2 | | | | | B13 | C13 | | | | | C2 | D2 | | | | | D13 | E13 | | | | | E2 | F2 | | | | |
| Layer 4 | M3 | N3 | | | | | N12 | A12 | | | | | A3 | B3 | | | | | B12 | C12 | | | | | C3 | D3 | | | | | D12 | E12 | | | | |
| Layer 5 | L11 | M11 | | | | | M4 | N4 | | | | | N11 | A11 | | | | | A4 | B4 | | | | | B11 | C11 | | | | | C4 | D4 | | | | |
| Layer 6 | I5 | L5 | | | | | L10 | M10 | | | | | M5 | N5 | | | | | N10 | A10 | | | | | A5 | B5 | | | | | B10 | C10 | | | | |
| Layer 7 | H9 | I9 | | | | | I6 | L6 | | | | | L9 | M9 | | | | | M6 | N6 | | | | | N9 | A9 | | | | | A6 | B6 | | | | |
| Layer 8 | G7 | H7 | | | | | H8 | I8 | | | | | I7 | L7 | | | | | L8 | M8 | | | | | M7 | N7 | | | | | N8 | A8 | | | | |

Slot - Opening

| 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|---|---|---|---|---|---|---|---|---|---|---|---|---|---|---|---|---|---|
| H15 | I15 | | | | | M16 | H16 | | | | | L15 | M15 | | | | | A16 | L16 | | | | | N15 | A15 | | | | | C16 | N16 | | | | |
| G1 | H1 | | | | | H14 | I14 | | | | | I1 | L1 | | | | | L14 | M14 | | | | | M1 | N1 | | | | | N14 | A14 | | | | |
| F13 | G13 | | | | | G2 | H2 | | | | | H13 | I13 | | | | | I2 | L2 | | | | | L13 | M13 | | | | | M2 | N2 | | | | |
| E3 | F3 | | | | | F12 | G12 | | | | | G3 | H3 | | | | | H12 | I12 | | | | | I3 | L3 | | | | | L12 | M12 | | | | |
| D11 | E11 | | | | | E4 | F4 | | | | | F11 | G11 | | | | | G4 | H4 | | | | | H11 | I11 | | | | | I4 | L4 | | | | |
| C5 | D5 | | | | | D10 | E10 | | | | | E5 | F5 | | | | | F10 | G10 | | | | | G5 | H5 | | | | | H10 | I10 | | | | |
| B9 | C9 | | | | | C6 | D6 | | | | | D9 | E9 | | | | | E6 | F6 | | | | | F9 | G9 | | | | | G6 | H6 | | | | |
| A7 | B7 | | | | | B8 | C8 | | | | | C7 | D7 | | | | | D8 | E8 | | | | | E7 | F7 | | | | | F8 | G8 | | | | |

262

261

| Phase U | Phase V | PhaseW |
|---|---|---|

FIG. 18

Slot – Bottom

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| Layer 1 | B15 | C31 | | | | | C16 | B16 | | | | | B31 | C15 | | | | | E32 | B32 | | | | | D15 | E31 | | | | | E16 | D16 | | | | |
| Layer 2 | A1 | B1 | | | | | B14 | C30 | | | | | C17 | B17 | | | | | B30 | C14 | | | | | C1 | D1 | | | | | D14 | E30 | | | | |
| Layer 3 | F29 | A13 | | | | | A2 | B2 | | | | | B13 | C29 | | | | | C18 | B18 | | | | | B29 | C13 | | | | | C2 | D2 | | | | |
| Layer 4 | A19 | F19 | | | | | F28 | A12 | | | | | A3 | B3 | | | | | B12 | C28 | | | | | C19 | B19 | | | | | B28 | C12 | | | | |
| Layer 5 | F11 | A27 | | | | | A20 | F20 | | | | | F27 | A11 | | | | | A4 | B4 | | | | | B11 | C27 | | | | | C20 | B20 | | | | |
| Layer 6 | E5 | F5 | | | | | F10 | A26 | | | | | A21 | F21 | | | | | F26 | A10 | | | | | A5 | B5 | | | | | B10 | C26 | | | | |
| Layer 7 | D25 | E9 | | | | | E6 | F6 | | | | | F9 | A25 | | | | | A22 | F22 | | | | | F25 | A9 | | | | | A6 | B6 | | | | |
| Layer 8 | E23 | D23 | | | | | D24 | E8 | | | | | E7 | F7 | | | | | F8 | A24 | | | | | A23 | F23 | | | | | F24 | A8 | | | | |

Slot – Opening

| 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|---|---|---|---|---|---|---|---|---|---|---|---|---|---|---|---|---|---|
| D31 | E15 | | | | | A32 | D32 | | | | | F15 | A31 | | | | | A16 | F16 | | | | | F31 | A15 | | | | | C32 | F32 | | | | |
| E17 | D17 | | | | | D30 | E14 | | | | | E1 | F1 | | | | | F14 | A30 | | | | | A17 | F17 | | | | | F30 | A14 | | | | |
| D13 | E29 | | | | | E18 | D18 | | | | | D29 | E13 | | | | | E2 | F2 | | | | | F13 | A29 | | | | | A18 | F18 | | | | |
| C3 | D3 | | | | | D12 | E28 | | | | | E19 | D19 | | | | | D28 | E12 | | | | | E3 | F3 | | | | | F12 | A28 | | | | |
| B27 | C11 | | | | | C4 | D4 | | | | | D11 | E27 | | | | | E20 | D20 | | | | | D27 | E11 | | | | | E4 | F4 | | | | |
| C21 | B21 | | | | | B26 | C10 | | | | | C5 | D5 | | | | | D10 | E26 | | | | | E21 | D21 | | | | | D26 | E10 | | | | |
| B9 | C25 | | | | | C22 | B22 | | | | | B25 | C9 | | | | | C6 | D6 | | | | | D9 | E25 | | | | | E22 | D22 | | | | |
| A7 | B7 | | | | | B8 | C24 | | | | | C23 | B23 | | | | | B24 | C8 | | | | | C7 | D7 | | | | | D8 | E24 | | | | |

| Phase U | Phase V | PhaseW |
|---|---|---|

FIG. 19

Slot – Bottom

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| Layer 1 | B15 | C47 | | | | | C32 | B16 | | | | | B31 | C31 | | | | | C16 | B32 | | | | | B47 | C15 | | | | | A48 | B48 | | | | |
| Layer 2 | A1 | B1 | | | | | B14 | C46 | | | | | C33 | B17 | | | | | B30 | C30 | | | | | C17 | B33 | | | | | B46 | C14 | | | | |
| Layer 3 | D45 | A13 | | | | | A2 | B2 | | | | | B13 | C45 | | | | | C34 | B18 | | | | | B29 | C29 | | | | | C18 | B34 | | | | |
| Layer 4 | A19 | D35 | | | | | D44 | A12 | | | | | A3 | B3 | | | | | B12 | C44 | | | | | C35 | B19 | | | | | B28 | C28 | | | | |
| Layer 5 | D27 | A27 | | | | | A20 | D36 | | | | | D43 | A11 | | | | | A4 | B4 | | | | | B11 | C43 | | | | | C36 | B20 | | | | |
| Layer 6 | A37 | D21 | | | | | D26 | A26 | | | | | A21 | D37 | | | | | D42 | A10 | | | | | A5 | B5 | | | | | B10 | C42 | | | | |
| Layer 7 | D9 | A41 | | | | | A38 | D22 | | | | | D25 | A25 | | | | | A22 | D38 | | | | | D41 | A9 | | | | | A6 | B6 | | | | |
| Layer 8 | C7 | D7 | | | | | D8 | A40 | | | | | A39 | D23 | | | | | D24 | A24 | | | | | A23 | D39 | | | | | D40 | A8 | | | | |

Slot – Opening

| 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|---|---|---|---|---|---|---|---|---|---|---|---|---|---|---|---|---|---|
| D15 | A47 | | | | | A32 | D16 | | | | | D31 | A31 | | | | | A16 | D32 | | | | | D47 | A15 | | | | | C48 | D48 | | | | |
| C1 | D1 | | | | | D14 | A46 | | | | | A33 | D17 | | | | | D30 | A30 | | | | | A17 | D33 | | | | | D46 | A14 | | | | |
| B45 | C13 | | | | | C2 | D2 | | | | | D13 | A45 | | | | | A34 | D18 | | | | | D29 | A29 | | | | | A18 | D34 | | | | |
| C19 | B35 | | | | | B44 | C12 | | | | | C3 | D3 | | | | | D12 | A44 | | | | | A35 | D19 | | | | | D28 | A28 | | | | |
| B27 | C27 | | | | | C20 | B36 | | | | | B43 | C11 | | | | | C4 | D4 | | | | | D11 | A43 | | | | | A36 | D20 | | | | |
| C37 | B21 | | | | | B26 | C26 | | | | | C21 | B37 | | | | | B42 | C10 | | | | | C5 | D5 | | | | | D10 | A42 | | | | |
| B9 | C41 | | | | | C38 | B22 | | | | | B25 | C25 | | | | | C22 | B38 | | | | | B41 | C9 | | | | | C6 | D6 | | | | |
| A7 | B7 | | | | | B8 | C40 | | | | | C39 | B23 | | | | | B24 | C24 | | | | | C23 | B39 | | | | | B40 | C8 | | | | |

| Phase U | Phase V | PhaseW |
|---|---|---|

FIG. 20

Slot – Bottom

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| Layer 1 | B15 | A95 | | | | | A80 | B16 | | | | | B31 | A79 | | | | | A64 | B32 | | | | | B47 | A63 | | | | | A48 | B48 | | | | |
| Layer 2 | A1 | B1 | | | | | B14 | A94 | | | | | A81 | B17 | | | | | B30 | A78 | | | | | A65 | B33 | | | | | B46 | A62 | | | | |
| Layer 3 | B93 | A13 | | | | | A2 | B2 | | | | | B13 | A93 | | | | | A82 | B18 | | | | | B29 | A77 | | | | | A66 | B34 | | | | |
| Layer 4 | A19 | B83 | | | | | B92 | A12 | | | | | A3 | B3 | | | | | B12 | A92 | | | | | A83 | B19 | | | | | B28 | A76 | | | | |
| Layer 5 | B75 | A27 | | | | | A20 | B84 | | | | | B91 | A11 | | | | | A4 | B4 | | | | | B11 | A91 | | | | | A84 | B20 | | | | |
| Layer 6 | A37 | B69 | | | | | B74 | A26 | | | | | A21 | B85 | | | | | B90 | A10 | | | | | A5 | B5 | | | | | B10 | A90 | | | | |
| Layer 7 | B57 | A41 | | | | | A38 | B70 | | | | | B73 | A25 | | | | | A22 | B86 | | | | | B89 | A9 | | | | | A6 | B6 | | | | |
| Layer 8 | A55 | B55 | | | | | B56 | A40 | | | | | A39 | B71 | | | | | B72 | A24 | | | | | A23 | B87 | | | | | B88 | A8 | | | | |

Slot – Opening

| 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|---|---|---|---|---|---|---|---|---|---|---|---|---|---|---|---|---|---|
| B63 | A47 | | | | | A32 | B64 | | | | | B79 | A31 | | | | | A16 | B80 | | | | | B95 | A15 | | | | | A96 | B96 | | | | |
| A49 | B49 | | | | | B62 | A46 | | | | | A33 | B65 | | | | | B78 | A30 | | | | | A17 | B81 | | | | | B94 | A14 | | | | |
| B45 | A61 | | | | | A50 | B50 | | | | | B61 | A45 | | | | | A34 | B66 | | | | | B77 | A29 | | | | | A18 | B82 | | | | |
| A67 | B35 | | | | | B44 | A60 | | | | | A51 | B51 | | | | | B60 | A44 | | | | | A35 | B67 | | | | | B76 | A28 | | | | |
| B27 | A75 | | | | | A68 | B36 | | | | | B43 | A59 | | | | | A52 | B52 | | | | | B59 | A43 | | | | | A36 | B68 | | | | |
| A85 | B21 | | | | | B26 | A74 | | | | | A69 | B37 | | | | | B42 | A58 | | | | | A53 | B53 | | | | | B58 | A42 | | | | |
| B9 | A89 | | | | | A86 | B22 | | | | | B25 | A73 | | | | | A70 | B38 | | | | | B41 | A57 | | | | | A54 | B54 | | | | |
| A7 | B7 | | | | | B8 | A88 | | | | | A87 | B23 | | | | | B24 | A72 | | | | | A71 | B39 | | | | | B40 | A56 | | | | |

| Phase U | Phase V | PhaseW |
|---|---|---|

FIG. 21

Slot – Bottom

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| Layer 1 | B15 | C31 |  |  |  |  | C16 | B16 |  |  |  |  | B31 | C15 |  |  |  |  | E32 | B32 |  |  |  |  | D15 | E31 |  |  |  |  | E16 | D16 |  |  |  |  |
| Layer 2 | A1 | B1 |  |  |  |  | B14 | C30 |  |  |  |  | C17 | B17 |  |  |  |  | B30 | C14 |  |  |  |  | C1 | D1 |  |  |  |  | D14 | E30 |  |  |  |  |
| Layer 3 | F27 | A11 |  |  |  |  | A4 | B4 |  |  |  |  | B11 | C27 |  |  |  |  | C20 | B20 |  |  |  |  | B27 | C11 |  |  |  |  | C4 | D4 |  |  |  |  |
| Layer 4 | A21 | F21 |  |  |  |  | F26 | A10 |  |  |  |  | A5 | B5 |  |  |  |  | B10 | C26 |  |  |  |  | C21 | B21 |  |  |  |  | B26 | C10 |  |  |  |  |
| Layer 5 | F29 | A13 |  |  |  |  | A2 | B2 |  |  |  |  | B13 | C29 |  |  |  |  | C18 | B18 |  |  |  |  | B29 | C13 |  |  |  |  | C2 | D2 |  |  |  |  |
| Layer 6 | A19 | F19 |  |  |  |  | F28 | A12 |  |  |  |  | A3 | B3 |  |  |  |  | B12 | C28 |  |  |  |  | C19 | B19 |  |  |  |  | B28 | C12 |  |  |  |  |
| Layer 7 | F9 | A25 |  |  |  |  | A22 | F22 |  |  |  |  | F25 | A9 |  |  |  |  | A6 | B6 |  |  |  |  | B9 | C25 |  |  |  |  | C22 | B22 |  |  |  |  |
| Layer 8 | E7 | F7 |  |  |  |  | F8 | A24 |  |  |  |  | A23 | F23 |  |  |  |  | F24 | A8 |  |  |  |  | A7 | B7 |  |  |  |  | B8 | C24 |  |  |  |  |

Slot – Opening

| 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|---|---|---|---|---|---|---|---|---|---|---|---|---|---|---|---|---|---|
| D31 | E15 |  |  |  |  | A32 | D32 |  |  |  |  | F15 | A31 |  |  |  |  | A16 | F16 |  |  |  |  | F31 | A15 |  |  |  |  | C32 | F32 |  |  |  |  |
| E17 | D17 |  |  |  |  | D30 | E14 |  |  |  |  | E1 | F1 |  |  |  |  | F14 | A30 |  |  |  |  | A17 | F17 |  |  |  |  | F30 | A14 |  |  |  |  |
| D11 | E27 |  |  |  |  | E20 | D20 |  |  |  |  | D27 | E11 |  |  |  |  | E4 | F4 |  |  |  |  | F11 | A27 |  |  |  |  | A20 | F20 |  |  |  |  |
| C5 | D5 |  |  |  |  | D10 | E26 |  |  |  |  | E21 | D21 |  |  |  |  | D26 | E10 |  |  |  |  | E5 | F5 |  |  |  |  | F10 | A26 |  |  |  |  |
| D13 | E29 |  |  |  |  | E18 | D18 |  |  |  |  | D29 | E13 |  |  |  |  | E2 | F2 |  |  |  |  | F13 | A29 |  |  |  |  | A18 | F18 |  |  |  |  |
| C3 | D3 |  |  |  |  | D12 | E28 |  |  |  |  | E19 | D19 |  |  |  |  | D28 | E12 |  |  |  |  | E3 | F3 |  |  |  |  | F12 | A28 |  |  |  |  |
| B25 | C9 |  |  |  |  | C6 | D6 |  |  |  |  | D9 | E25 |  |  |  |  | E22 | D22 |  |  |  |  | D25 | E9 |  |  |  |  | E6 | F6 |  |  |  |  |
| C23 | B23 |  |  |  |  | B24 | C8 |  |  |  |  | C7 | D7 |  |  |  |  | D8 | E24 |  |  |  |  | E23 | D23 |  |  |  |  | D24 | E8 |  |  |  |  |

| Phase U | Phase V | PhaseW |
|---|---|---|

FIG. 22

Slot – Bottom

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| Layer 1 | C8 | B4 | D12 | | | | | | | D11 | C7 | B3 | | | | | | | A8 | D4 | B12 | | | | | | | B11 | A7 | D3 | | | | | | |
| Layer 2 | B10 | A6 | D2 | | | | | | | C9 | B5 | A1 | | | | | | | D10 | C6 | B2 | | | | | | | A9 | D5 | C1 | | | | | | |
| Layer 3 | A10 | D6 | C2 | | | | | | | B9 | A5 | D1 | | | | | | | C10 | B6 | A2 | | | | | | | D9 | C5 | B1 | | | | | | |
| Layer 4 | D8 | C4 | A12 | | | | | | | A11 | D7 | C3 | | | | | | | B8 | A4 | C12 | | | | | | | C11 | B7 | A3 | | | | | | |

Slot – Opening

Phase U | Phase V | PhaseW

Phase U | Phase V | PhaseW

STATOR OR ROTOR WINDING WITH HIGH CONFIGURABILITY, AND STATOR OR ROTOR USING SUCH A WINDING

CROSS-REFERENCE TO RELATED APPLICATIONS

This application is a National Phase filing of PCT International Application No. PCT/IB2023/061742, having an International Filing Date of Nov. 21, 2023, claiming priority to Italian Patent Application No. 102023000004140, having a filing date of Mar. 7, 2023, each of which is hereby incorporated by reference in its entirety.

FIELD OF THE INVENTION

The present invention relates to stator or rotor winding with high configurability, and a stator or rotor using such a winding.

BACKGROUND ART

It is generally known to provide stators or rotors of electric machines, such as generators or electric motors, e.g., for applications on hybrid electric vehicles (HEVs), in which the stator or rotor winding (single-phase or polyphase) consists of a plurality of bar conductors bent and variously interconnected to one another so as to obtain electric windings also known as "bar windings". Such bent bar conductors are also referred to as "hairpin conductors" or simply "hairpins". Bar windings can consist of one or more groups of concentric windings, sometimes known as "crowns", each winding group already being a winding per se ("winding sets"). In turn, each crown can consist of one or more layers, see below, and therefore a winding can consist of one or more bar layers. Each layer can comprise a series of whole bar conductors or it can also consist of bar conductor portions straddling two or more layers.

In particular, windings with hairpins having a circular cross-section (also referred to as "round-wire conductors") or a rectangular cross-section, or even conductors with a variable cross-section geometry along the length (e.g., round conductors made rectangular in the part housed in the slot) are known in the prior art. In this respect, "rectangular" or "square" conductor wire means, in this description, a wire having four substantially flat sides, each joined to the adjacent sides, typically by a rounded edge. Bar conductors having a trapezoidal-shaped cross-section are known.

The aforesaid bar conductors are usually preformed by bending, in a "U" or "P" shape, starting from straight bar conductors. U.S. Pat. No. 7,480,987 describes an example of a method for preforming straight bar conductors to form hairpins. "U" or "P"-shaped preformed conductors, also often referred to as "preformed basic conductors" in the technical field, typically have two adjacent legs of equal or different length, each having a free end portion and an opposite end portion connected to the other of the two leg by means of a bridge-like connecting portion. Since the end portions protrude when they are inserted into the rotor or stator, they will henceforth be referred to as the "free protruding portion" and "opposite connected protruding portion". The connected protruding portion can also be referred to as the "head portion" or "bridge-like connected portion". The assembly of the "head portions" of the legs of the same hairpin forms the so-called "bridge-like connection" or "bridge connection" or "hairpin head portion".

With reference to FIG. 1(*a*), a hairpin 255 is preformed from a linear hairpin (not shown) by bending it to form a first leg 255*a* with a respective free protruding end portion 255*a*E and a second leg 255*b* with a respective free protruding end portion 255*b*E. The bending simultaneously forms a bridge-like connector 255*c* between the two legs 255*a*, 255*b*. The preformed hairpin, in this example, is in the shape of a flattened "U". To form a stator of an electric machine, for example, it is known to subject the "U" or "P"-shaped preformed hairpins to two different types of twisting.

A stator or rotor core of a radial magnetic flux electric machine is substantially a ring having two flat faces and two cylindrical surfaces, having generators perpendicular to the two flat faces parallel to the rotation axis of the rotor of the electric machine. The radial, circumferential, and axial directions hereinafter refer to the latter axis, unless otherwise specified. One of the two cylindrical surfaces is adjacent, at least in part, to the air gap of the electric machine, to which said stator or rotor belongs and defines a set of slots in which the straight parts of the winding are housed. The two flat surfaces are divided into the insertion surface or side and the surface or side opposite to the insertion side (welding side). The parts of the winding which protrude from said core are referred to as headers. The ends of the free portions of the conductors belong to the header protruding from the side opposite to the insertion side, most of which are subject to welding. If protruding portions connected in a bridge-like manner to the legs inserted into the stator slots are present in the winding, they belong to the header protruding from the insertion side. The portions protruding from the insertion side, either free or connected in a bridge-like manner, are indicated hereafter as portions protruding from the insertion side.

The stator or rotor core region between one slot and an adjacent one is referred to as a tooth. The number of teeth is equal to the number of slots. The connecting part of the teeth of the core is referred to as a yoke, which defines a portion of each slot and is located relative thereto on the side opposite to the slot opening on the air gap of the machine.

The slot can be divided into an array of positions in each of which a leg of a basic conductor can be placed. The conductors (or conductor portions) housed in the same radial position as the slots define a so-called winding layer. The series of slots closest to the axis of the array (stator or rotor) is generally referred to as "proximal layer", while the series of slots farthest from the axis of the array (stator or rotor) is generally referred to as "distal layer".

In a first type of twisting, also referred to as "twisting on the insertion side", the preformed basic conductors are appropriately inserted into corresponding radially aligned pockets or "slots" provided in a twisting device, adapted to deform such conductors after insertion. The twisting device is substantially used to spread the legs of the "U" or "P" shape so that, after extracting the conductor from the twisting device, the two legs of each conductor can then be inserted into a corresponding pair of slots of a stator core, which are mutually angularly offset by a predetermined distance, substantially equal to the angular distance between the slots, in which the legs are then inserted, and radially spaced apart by the radial distance between the slot positions occupied by the legs, respectively.

Starting from a preformed hairpin, for example, but not exclusively as in FIG. 1(*a*), a hairpin of a suitable shape for the insertion thereof into the stator (or rotor) is formed by widening the legs 255*a*, 255*b* and shaping the bridge-like connector 255*c*, e.g., to obtain the shape in FIG. 1(*b*).

Reference numeral 255*p* indicates the pitch of the hairpin, i.e., the linear distance or the angular distance, or the distance in terms of slot pitches or more generally "volume units", between the legs. It should be noted that in this case the central top 255*c*2 of the formed hairpin is the basic conductor in which the cross-section of the conductor is subjected to a 180° rotation with respect to the median surface of the hairpin (the ideal surface passing inside the hairpin and including the two legs). Such a rotation is useful in some stranded hairpins, which will be defined hereafter, with the purpose of transposing the layers (exchange of slot positions) thus reducing eddy currents circulating through the ends of the layers when they are welded together, compared with the case in which the same layers run parallel without exchanging slot position in the transition from one leg to the other.

The patent application published under number US 2009/0178270 describes an example of a twisting method on the insertion side for twisting, at a uniform pitch, the preformed bar pins after inserting them into the pockets of a twisting device, in which the hairpins have a rectangular section.

According to the prior art and with reference to FIG. 2, the hairpins can also be obtained by molding, in which process a straight conductor is pressed against a contrast with a punch and die type system. FIG. 2(*a*) shows such a molded conductor; it does not have a cross-section which rotates with respect to the median surface of the hairpin.

This molded hairpin or also a preformed and spread hairpin, obtained as described above, can be subjected to the so-called "welding side twisting", in which case it is possible to introduce a "step-like" shape of the protruding portions of the legs 255*a* and 255*b*, in which, for example, the leg 255*a* has a first straight portion 255*a*1, a step-like portion 255*a*2 and a second straight portion 255*a*3 (substantially corresponding to portion 255*a*E in FIG. 1), as in FIG. 2(*b*).

With reference to FIG. 3, the shape of the protruding portion on the insertion side, i.e., of the bridge-like connector 255*c*, for a molded hairpin, can comprise three portions 255*c*1, 255*c*3, and 255*c*2 starting from the connection to the second leg 255*b* and finishing at the connection to the first leg 255*a* (hidden from view in FIG. 3). The portion 255*cl* has a main extension direction B and a radius of curvature RB, the portion 255*c*3 has a main extension direction A and a radius of curvature RA, the portion 255*c*2 has a main extension direction C (and possibly a curvature thereof, not indicated). Hereafter, the portion 255*c*2 is referred to as the "layer change bend"; indeed, by virtue thereof, the head and leg portions of the hairpins are on different layers when they are inserted into the respective slots of the stator pack. Reference $\alpha 1$ indicates the angle between the directions A and C, reference $\alpha 2$ indicates the angle between directions A and B and reference $\alpha 3$ indicates the angle between directions B and C, equal to the sum of the angles $\alpha 1$ and $\alpha 2$. This is only one of the final possible shapes of a hairpin, all other shapes with different portions and shapes of both the bridge-like portion and the legs are usable with the apparatus and a method according to the present description.

There are also conductors defined as "reverse" conductors (not shown), and they are hairpins with a bending direction in the bridge-like connection opposite to that of most hairpins that form the same winding. These are used for passing from the last layer of a crown to the first layer of the next crown.

Moreover, and with reference to FIG. 4A, there is a stranded hairpin with a reversal of the cross-section at the bending point (FIG. 4A(a)), which causes the exchange of the position occupied by the layers. As noted from the type of hatching of the cross-sections in FIG. 4A(a), by virtue of such a reversal, or exchange of position, the upper layer in the pair of layers in the left slot is below the other one in the right slot. In another hairpin form, the transposition can be continuous along the portions of the hairpin housed in the slot (FIG. 4A(b); U.S. Pat. No. 3,837,072). The variant shown in FIG. 4B is a stranded hairpin devoid of reversal, shown in U.S. Pat. No. 8,552,611 B2. FIG. 4C (obtained from FIG. 6 of U.S. Pat. No. 6,894,417 B2) provides variants of the arrangement of the legs of the stranded hairpins 255-S in a double-crown winding in different slot positions. Reference letters A and B indicate the crown to which the legs belong, shown in the slot (belonging to different hairpins).

With illustrative reference to FIG. 4D (obtained from U.S. Pat. No. 10,749,399B2), there is also the so-called "inversion hairpin" 255-IP, i.e., a hairpin which can be formed by spreading the legs (not with the insertion-side twisting method described above) or molded with "press and die" systems, characterized in that the legs in the respective slots occupy the same radial position (generally referring to "single-layer hairpin"), i.e., they belong to the same layer. Therefore, usually (except in the case of backtwisting in the inner crown and in the outer crown) the ends of the single-layer hairpin on the twisting side will be bent in the same direction. In fact, the portions protruding on the side of the bridge-like connector can be bent in the same tangential direction or they can take a V shape. At least two layer change bends can be required on the connector portion.

Finally, there are pairs of hairpins 255-AC, the homologous legs of which belong to different layers (FIG. 4E(a)) or to the same layer (FIG. 4E(b)) and they are configured and dimensioned to be nested (irrespective of the difference in pitch (or "volume units") between the nested elements). The nested conductors are each smaller than the other and therefore, one inside the other. Therefore, it is believed that the most suitable English term is "nested hairpins"; in any case, the configuration thereof is apparent from the drawings.

Hereinafter, all the hairpin types described above and any other hairpin, with any number of legs and also coupled, will be included in the term "basic conductors".

After being subjected to the first type of twisting or after being molded, the basic conductors are typically pre-assembled in a winding set as stated above. The pre-assembly apparatus will have a set of slots, generally in an equal number to the slots of the stator associated with the winding, into which the legs of each hairpin are inserted, and it will generally be different from the twisting device.

The winding set is then inserted en bloc into the slots of the stator core through a first side thereof (so-called "insertion side" or "insertion face") with the respective free portions protruding from a second side of the core (so-called "welding side" or "connection side" or "welding face" or "escaping face") opposite to the first side. Systems for transferring the winding and inserting it into a stator pack are also known.

Based on the specific winding pattern to be obtained, the free portions of the basic conductors protruding from the side opposite to the insertion side can then be subjected to a second type of twisting, also referred to as "twisting on the welding side", e.g., after having been inserted into pockets made in an appropriate twisting equipment. Here, the twisting equipment has the purpose of bending or twisting the free portions of the conductors to appropriately shape such free portions and thus allow obtaining the appropriate electric connections between the conductors to complete the winding. A patent application published under number US 2009/0302705 describes an example of a twisting method on the welding side of the type discussed above.

The prior art provides different types of winding. However, the windings often use special connections, such as "jumpers" and/or the apparatuses to make them are very different from one another. One example of a jumper is provided in FIG. 4F, where different conductors 255, positioned at least partially on the same layer, are connected to one another by means of the jumper 270, which shall be understood as a special connection. Jumpers are normally made with connections to be welded which can be of various types. In other words, some types of winding involve important changes to the production apparatuses.

Thus, the need is felt for polyphase winding patterns capable of simply varying the number of parallel pathways without modifying the components forming the winding (hairpins in general) and without adding any special connections. This flexibility should occur without compromising the correct arrangement of the basic conductors in the stator slots and thus the electric balance of the various parallel pathways.

To illustrate such a situation of electric balance, here is an example of a winding with metal strip technology. In this case, the position of the conductors in the slot is predetermined. Indicating with m the number of layers in the slot of a stator of an electric machine with radial or axial flow and with Z the number of slots, the total number of basic conductors (single strip crossing the frame) will be equal to $n_l \cdot Z$. Instead, the number of basic conductors crossing the frame for a single phase, is equal to $$\frac{n_l \cdot Z}{m},$$

having indicated with m the number of phases.

For example, imagining ideally cutting, with a radial direction, a wound stator and developing it on a plane, it is possible to see every single position of each basic conductor and therefore all the $n_l \cdot Z$ positions of the conductors. FIG. 6(*a*) shows an example with number of slots Z=24, a number of layers $n_l$=4 and number of pole pairs p=2 (pairs of magnetic poles of the electric machine with opposite polarity). The position of the basic conductors associated with each phase can be identified by means of the letters U, V and W, respectively. Instead, the mark following the letter identifies the direction of the current in a determined moment in time t and can be represented by means of a normal versor on the sheet. After identifying the phase of belonging for the general cell and the direction of the current, it is necessary to add the information relative to the cardinality of the basic conductors.

In general, in an electric machine, the phases are grouped into magnetic poles, and within the sphere of each magnetic pole, there is provided a number of adjacent slots, at least equal to the number of phases, respectively. In FIGS. 6(*b*) and 7 you can see that the first basic conductor 255 (or semi-coil) of a general pathway (where a "pathway" is a path for the current in the winding) of a phase (in this case, phase U) can be identified by number N=1, placed after an identification letter of the pathway (in this particular case pathway A); the second conductor (or semi-coil) will be identified by number N=2, . . . , the last conductor (or semi-coil) of a general pathway belonging to a phase will be identified by number $$N = \frac{n_l \cdot Z}{m \cdot a},$$

with a equal to then number of parallel pathways per phase.

At this point, after defining the winding, it is necessary to discriminate the various welding points which allow forming the complete winding. As a general rule the welding point is between the general conductor (or semi-coil) "N" and the next "N+1", with equal "N". Therefore, the general hairpin can be identified by the conductor (or semi-coil) "N" and the next "N+1", with odd "N".

Moreover, it is possible to note a certain spatial periodicity of the positions occupied by the conductors for a general phase. In particular, it is possible to define one or more "standard modules" or "standard models", as shown in FIG. 8 in two cases, and in FIG. 9 a complete example for the second case in FIG. 8. When a standard module is repeated with a certain periodicity, it allows obtaining the cells identifying a general phase. Different standard modules can be used for different phases (on different layers).

In order for the pathways of a general phase to be electrically balanced, it is advantageous for the N conductors (or semi-coils) of each pathway to be uniformly distributed inside all the positions to be occupied, with $$N = \frac{n_l \cdot Z}{m \cdot a}.$$

FIG. 10 shows one of the two pathways of phase U and the respective arrangement of the conductors (or semi-coils) so as to ensure the electric balance between the same (it is an arrangement with two pathways because the semi-coils A occupy half of each phase, the other half is occupied by the second pathway, not shown to facilitate reading; yp is the hairpin pitch (between slots or volume units"), expressed in terms of number of slots). In particular, note that conductors (semi-coils) 1 and 3 occupy the portion on the left of the "standard module" in layer 1 (distal layer), while conductors 14 and 16 occupy the portion on the right of the "standard module" in layer 1. Thereby, a correct arrangement of the conductors of the general pathway of a phase in layer 1 is obtained. The same consideration can be made for the remaining layers.

In this prior art arrangement, conductors 8 and 9, positioned on the same layer, are connected to one another by means of a special connection (jumpers, see above). This allows connecting, in series, the semi-coils from 1 to 8, positioned in the portion on the left of the "standard module", with the semi-coils from 9 to 16, positioned in the portion on the right of the "standard module". Also note that the jumper relative to the pathway shown in FIG. 10 of the general phase (in this case phase U) has a pitch of 5 slots; the second pathway, not shown in the figure, can occupy the remaining cells associated with the same phase (in this particular case, phase U, identified by the cells with a dotted background) and it can comprise a jumper with a pitch of 7 (5) slots if the starting conductor 1 is in layer 1 (4).

Thereby, the two parallel pathways are electrically balanced, by virtue of the uniform distribution of the conductors of each pathway on each layer. However, in an industrial process, the presence of these special components (jumpers) complicates the whole process, from the forming thereof to the resin treatment of the product. Therefore, the implementation of winding patterns not using them or using them limitedly to a few particular cases, without compromising the electric balance, is desirable.

One example of winding patterns without jumpers can be found in U.S. Pat. No. 10,749,399 (Riedl et al.). In such a prior art, the common feature is the presence of single-layer hairpins. In fact, a hairpin is generally shaped so that, in the winding, the legs thereof are positioned on two different layers and mutually adjacent. On the other hand, the single-layer hairpin (or "inversion hairpin") is shaped so that the legs thereof are positioned in the same layer. Single-layer hairpins are normally used in the innermost (proximal) layer and in the outermost (distal) layer of the winding. Moreover, in the aforesaid patent, these innermost and outermost hairpins have a specific relation between each other in terms of hairpin pitch, i.e., the innermost ones (towards the winding axis) are shorter or longer exactly by one slot pitch. It should be noted that the patent explicitly eliminates the presence of jumpers in most cases, but not all (note that in the array patterns in the figures, the inner layers are those with greater cardinality (at the bottom of the table)).

However, this particular design choice does not offer suitable flexibility, as defined above, because the achievable parallel pathways are limited in number, if it is desirable not to compromise the electric balance thereof. For example, in the aforesaid patent, the pitch of the hairpins in one of the two single layers (inner or outer) is preferably equal to the greater pitch of the standard winding hairpins (those belonging to the central crowns of the stator winding). Moreover, in the aforesaid patent, it is not possible to reach the maximum number of parallel pathways without compromising the electric balance between the pathways themselves, also in the presence of nested single-layer hairpins. Again, in the aforesaid patent, it is not possible to reach the maximum number parallel of pathways, without compromising the electric balance between the pathways themselves, also in the presence of "stranded hairpins", the stranded hairpins, in many cases, being useful in the windings. Moreover, the twisting pitch (definable as "the angle brushed by the conductor (in angular terms or in terms of slot pitches) during the twisting phase to reach the conductor to which it must be welded to make the winding") on each layer is probably fixed because other conductor be arrangement techniques should otherwise applied, which are not even mentioned. With these declared constraints, it is not possible to reach the maximum number of balanced parallel pathways, for a given combination of number of slots, number of layers and number of pole pairs. In fact, the state of maximum number of parallel pathways requires only one single-layer hairpin per end layer per pathway; this means that at least one of the two single-layer hairpins must have the legs in the same portion (right or left) of the "standard module", in the winding of the prior art. This condition violates the aforesaid criterion of electric balance.

FIG. 11 shows an example of a winding pattern made according to the teaching of U.S. Ser. No. 10/749,399 (Riedl et al.), comprising a number of slots Z=24, a number of phases m=3, a number of pole pairs p=2 and a number of parallel pathways a=4. FIG. 7 of the prior art the standard hairpins have a pitch of 6 slots. Instead, the single-layer hairpins in FIG. 11, have a pitch of 6 slots and 7 slots for the layer 4 (1) and the layer 1 (4), respectively. By evaluating the spatial arrangement of the conductors belonging to a general pathway of a phase on each single layer, it is noted that the aforesaid criterion is not respected (non-uniform distribution).

FIG. 12 shows an example of a winding pattern of the same prior art comprising a number of slots Z=24, a number of phases m=3, a number of pole pairs p=2 and a number of parallel pathways a=4 (only one pathway is shown). Instead, the single-layer hairpins in FIG. have a pitch of 6 slots and 5 slots for the layer 4 (1) and the layer 1 (4), respectively. By evaluating the spatial arrangement of the conductors belonging to a general pathway of a phase on each single layer, it is noted that the aforesaid criterion is not respected (non-uniform distribution of legs on the same position in the pair of positions of the phase).

In the winding in FIG. 13, again constructed according to the same prior art, note that:

- In (distal) layer 1, the conductors A7 and A8 occupy the left and right portion of the "standard module", respectively;
- In layer 2, the conductors A1 and A6 both occupy the left portion of the "standard module";
- In layer 3, the conductors A2 and A5 both occupy the left portion of the "standard module"; and
- In (proximal) layer 4, the conductors A3 and A4 both occupy the left portion of the "standard module".

The arrangement obtained results in an imperfectly balanced winding pattern.

FIG. 14 shows the case in which standard hairpins have a pitch of 5 slots. On the other hand, the single-layer hairpins have a pitch of 6 slots and 5 slots for the layer 4 (1) and the layer 1 (4), respectively. By evaluating the spatial arrangement of the conductors belonging to a general pathway of a phase on each single layer, it is noted that the aforesaid criterion is not respected (non-uniform distribution).

The same reasoning can be made for all four parallel pathways shown in FIG. 15. This arrangement results in an imperfectly balanced winding pattern.

Document DE102019218115A1 is also known, describing the winding patterns using single-layer conductors, however they are not used in the distal and proximal layers, but in intermediate layers. More importantly, they are used in only one intermediate layer, thus without a difference in pitch therebetween (in the same winding pattern), for example, see arc conductors 570,670 (referred to as "deflection conductor") in FIGS. 5,6. Note instead that in FIG. 4, arc conductors 451, 452, 453 and 454 all make a layer jump. Therefore, document DE102019218115A1 cannot overcome the problems of the aforesaid situations.

Again, document EP4138269A1 is known, which provides winding patterns with two types of hairpins with a different pitch. Such hairpins are arranged alternately along the circumferential direction on each layer and are wired in intersecting directions. Therefore, the multiple conductors forming each parallel circuit are uniformly distributed in each slit and in each layer so as to form a balanced parallel circuit, thus, by virtue of the balanced parallel circuit, allowing each parallel circuit to have the same magnetic interconnection flow and allowing the electric current to flow, in a balanced manner, along the multiple parallel circuits. However, such a document does not address the balance in the case of using single-layer conductors which are used to avoid jumper conductors, as shown above.

There is a need for innovation in the structure of the polyphase stator or rotor windings, which allows obtaining a wider family of windings and therefore of electrically balanced stators or rotors, preferably maintaining the diameter at the air gap, the number of slots, and the dimensions of the conductor.

Purpose and Object of the Invention

It is the object of the present invention to provide a stator or rotor winding with high configurability, and a stator or rotor using such a winding, overcoming, completely or partially, the problems and drawbacks of the prior art.

The present invention relates to a stator or rotor winding with high configurability, and a stator or rotor using such a winding according to the appended claims.

LIST OF FIGURES

The invention will now be described by way of non-limiting example, with particular reference to the figures of the accompanying drawings, in which:

FIG. 3 shows the hairpin in 2(*a*) from the top, according to the prior art;

FIG. 4A shows in (a) a stranded hairpin with reversal of the cross-section at the bending point and, in (b), with continuous transposition along the portions of the hairpin housed in a slot, according to the prior art;

FIG. 4B shows a stranded type of hairpin;

FIG. 4C shows, in (a)-(c), three possible arrangements of the hairpin legs of a double-crown winding in various positions in the slot; A and B indicate the crown to which the legs shown in the slot belong (belonging to different hairpins);

FIG. 4D shows an example of an "inversion hairpin", according to the prior art;

FIG. 4E shows in (a) an example of a hairpin nested on different layers and in (b) an example of a hairpin nested on the same layer, according to the prior art;

FIG. 4F shows an example of use of a jumper, according to the prior art;

FIG. 5 shows an example of a single-layer hairpin, according to the prior art;

Figure 1:
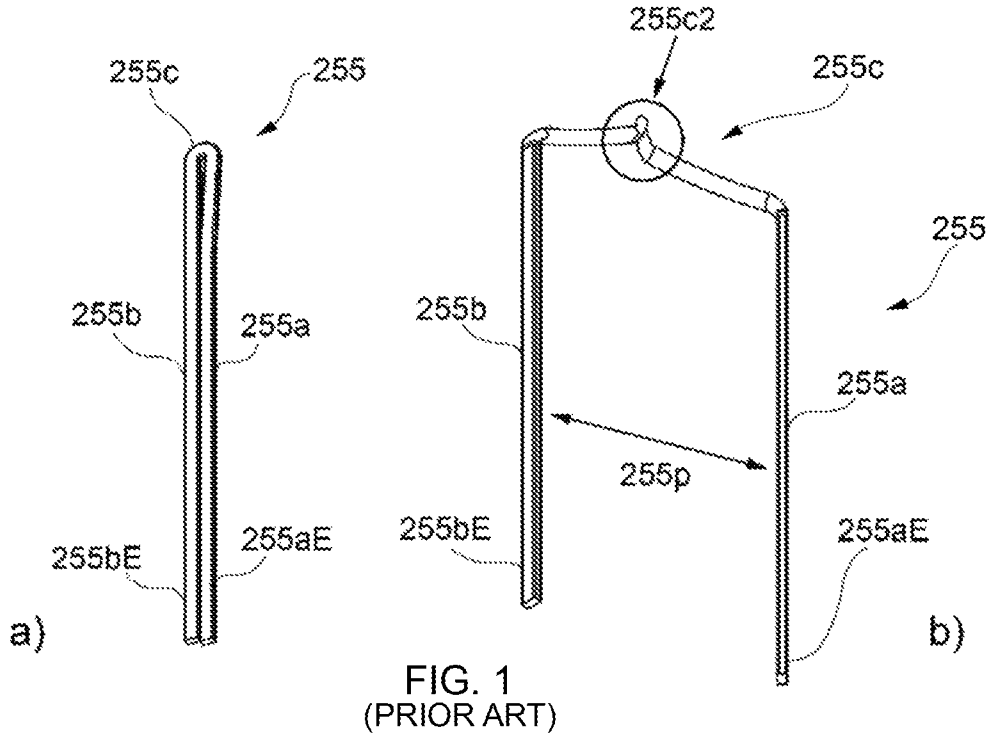
FIG. 1 (PRIOR ART)
FIG. 1 shows in (a) a preformed flattened U-shaped hairpin and, in (b), a formed hairpin, according to the prior art.
Figure 2:
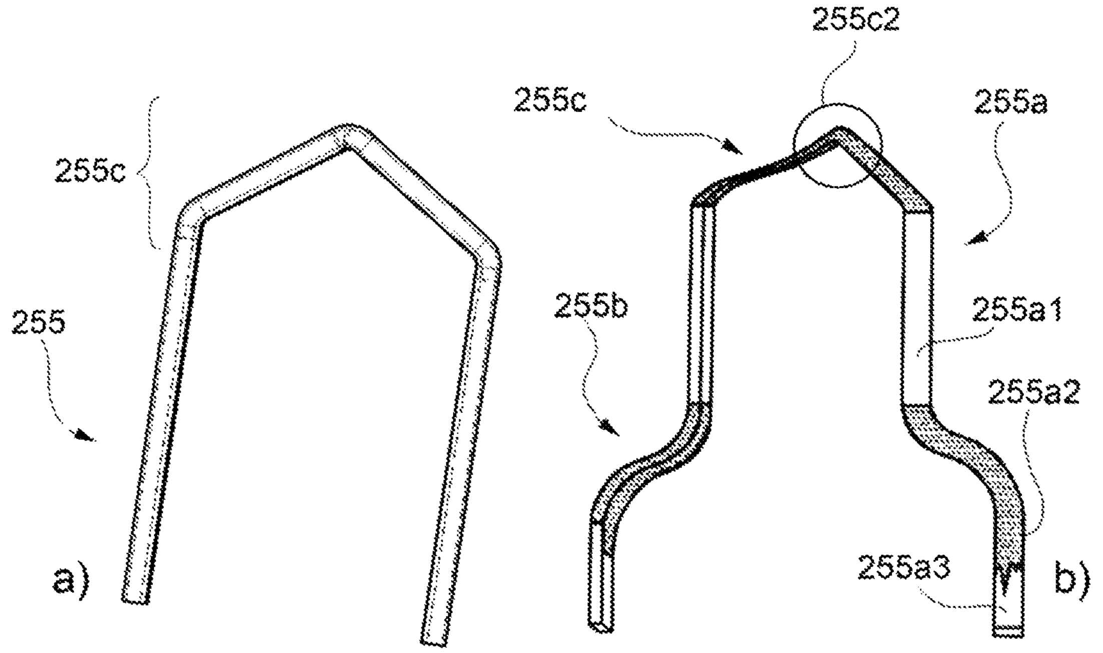
FIG. 2 (PRIOR ART)
FIG. 2 shows in (a) a molded conductor, and in (b) a conductor after being subjected to a welding-side twisting.
Figure 6:
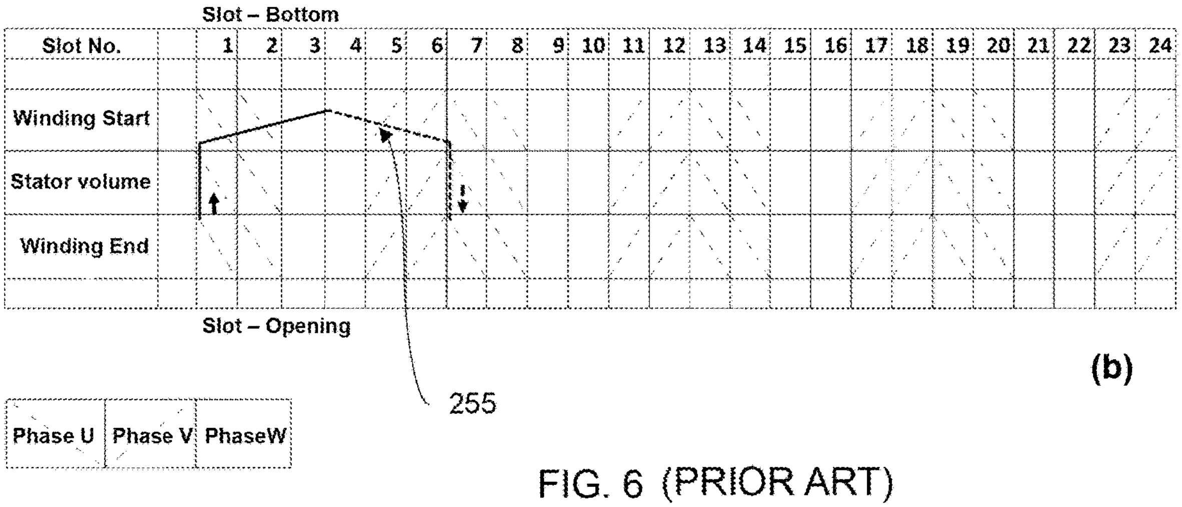
FIG. 6 (PRIOR ART)
Figure 7:
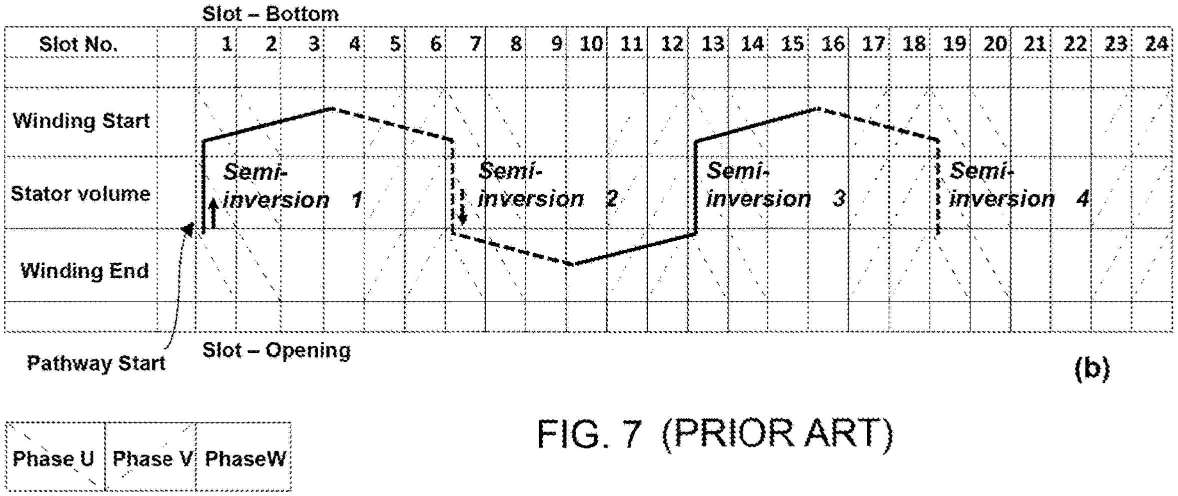
FIG. 7 (PRIOR ART)
Figure 8:
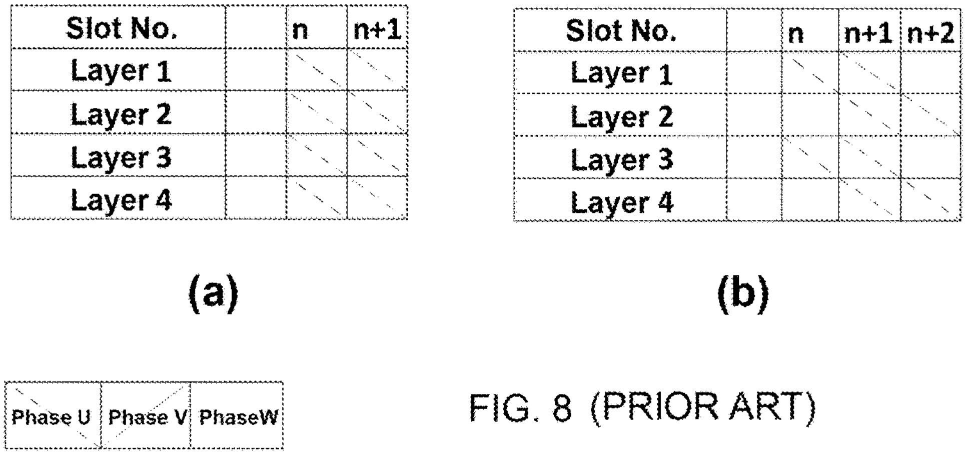
FIG. 8 (PRIOR ART)
Figure 9:
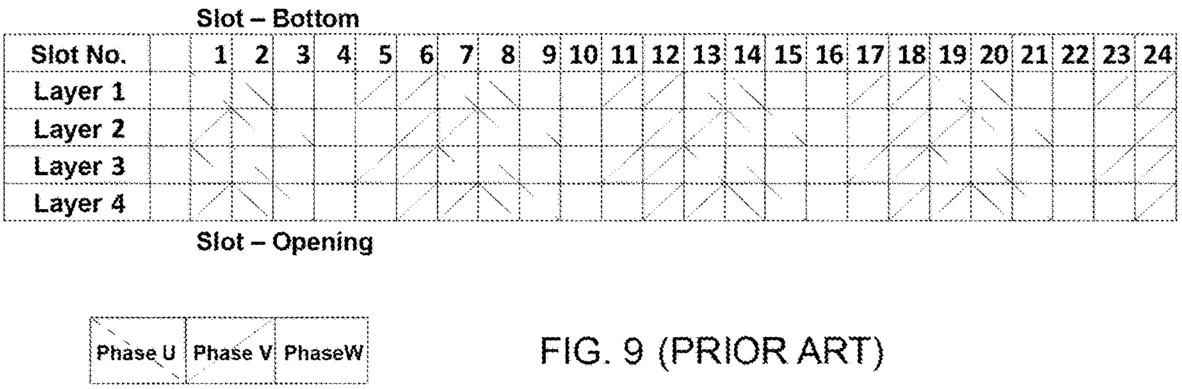
FIG. 9 (PRIOR ART)
Figure 10:
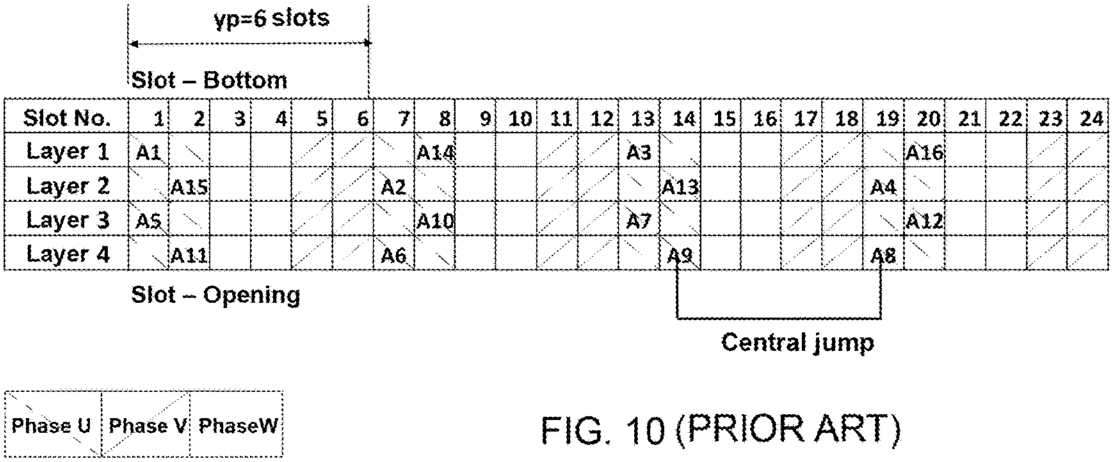
FIG. 10 (PRIOR ART)
Figure 14:
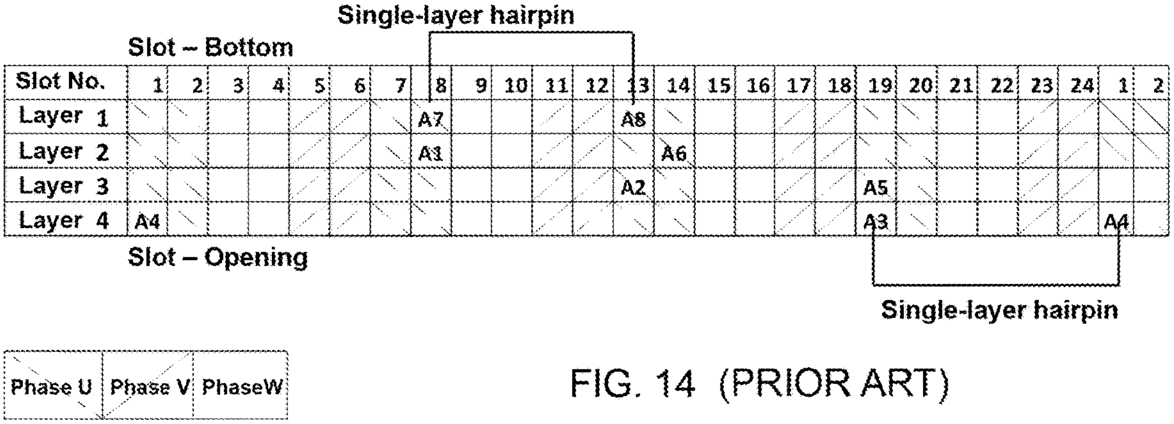
FIG. 14 (PRIOR ART)
Figure 15:
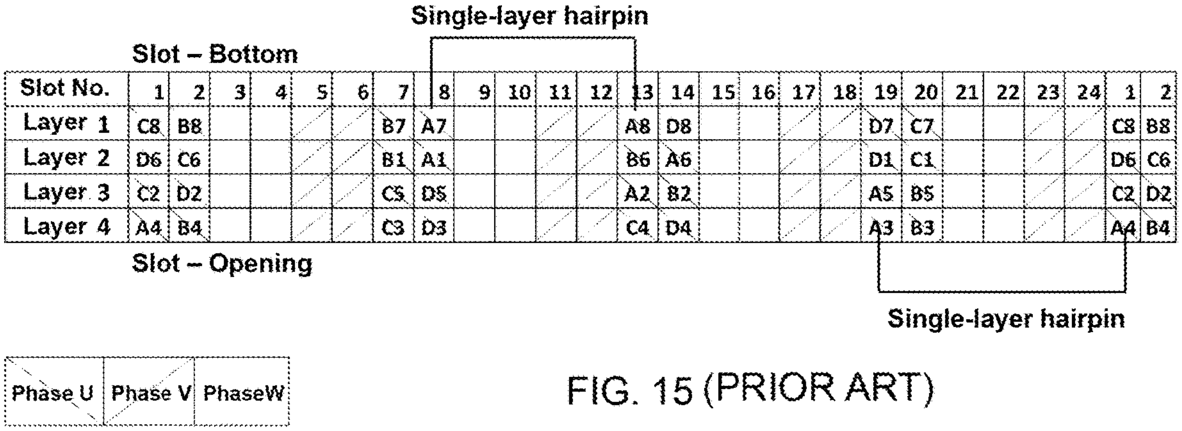
FIG. 15 (PRIOR ART)
Figure 16:
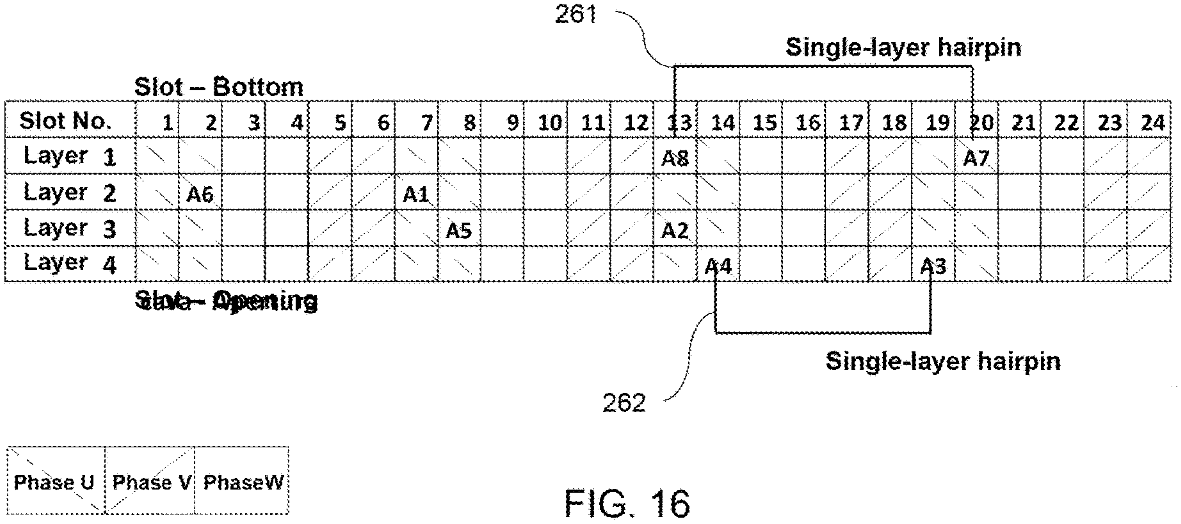
Figure 17:
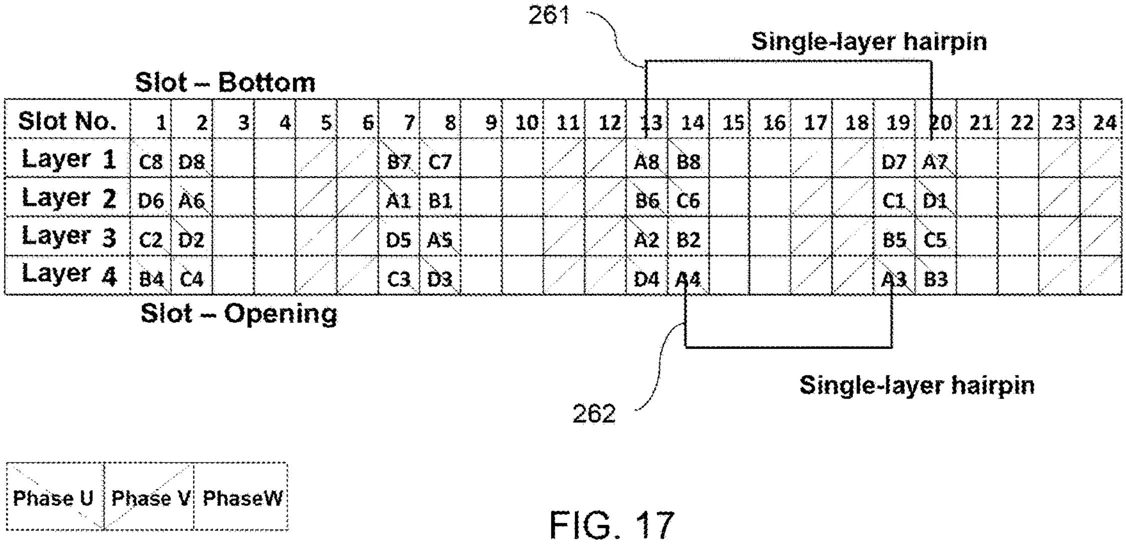
Figures 23, 24:
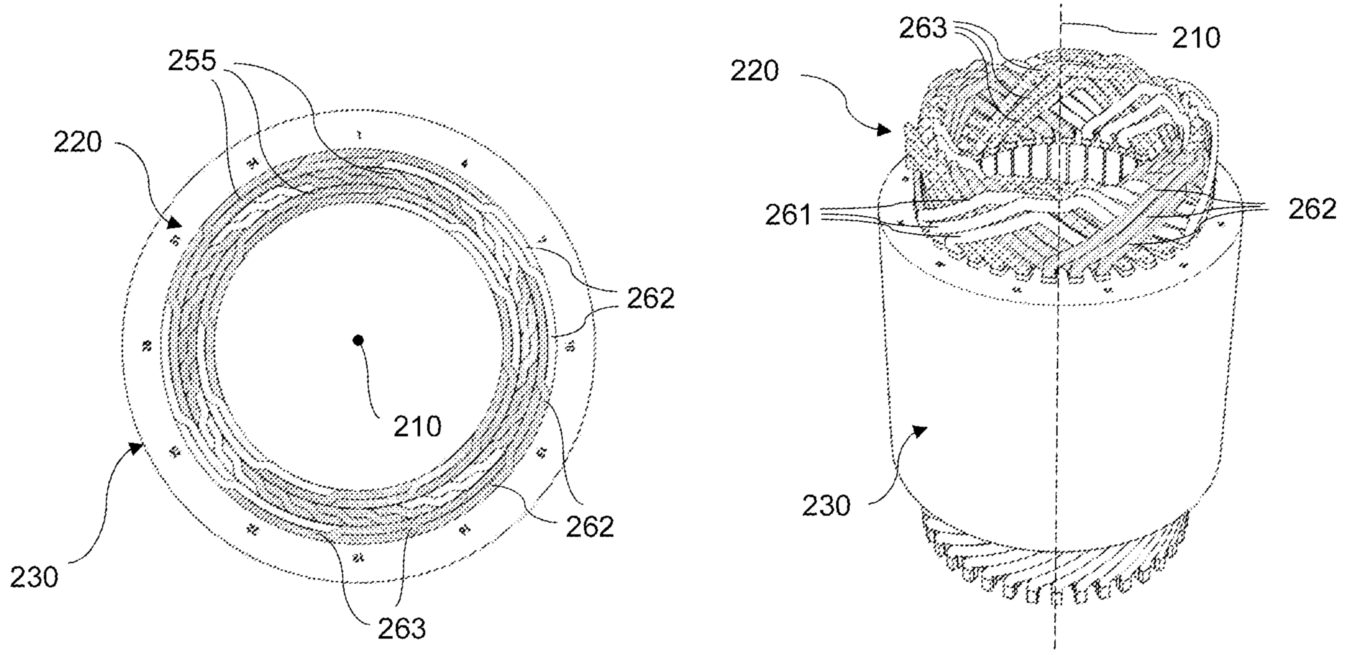

FIG. 6 shows, in (a), a winding pattern linear representation of a stator with 24 slots, 4 layers and 2 pole pairs. The position of the conductors associated with each phase can be identified by means of the letters U, V and W, respectively (the phase is further indicated by the background of the cell: diagonal bar towards the left for U, no background for W and diagonal bar towards the right for V), while the mark following the letter identifies the direction of the current in a determined moment in time t and can be represented by a normal versor on the sheet; and in (b) a planar representation of the stator with only one coil, having the legs or semi-coils in slot 1 and slot 7, respectively (the phases are indicated by the same graphical convention as the cells in (a)), according to an example of the prior art;

FIG. 7 shows the construction of a pathway, starting from basic conductor semi-coils, where, in (a) the slot array is given with textual indication of the positions and in (b) with the drawing of the semi-coils (the phases are indicated by the same graphical convention as the cells in FIG. 6), according to the prior art;

FIG. 8 shows in (a) a standard module of the winding in FIG. 7, and in (b) a standard module of the winding in FIG. 9, according to an example of the prior art (same convention as the preceding figures for the phases);

FIG. 9 shows a complete winding according to the model (b) in FIG. 8 (same convention as the preceding figures for the phases);

FIG. 10 shows one of the two pathways (A) of the phase U (same convention as the preceding figures for the phases) and the respective arrangement of the conductors (or semi-coils) so that the electric balance can be ensured between the same, according to an example of the prior art;

FIG. 11 shows an arrangement of the conductors of all four of the pathways of a phase for a winding with number of slots Z=24, number of pole pairs p=2, number of phases m=3 (same convention as the preceding figures for the phases) and number of pathways a=4, according to an example of the prior art;

FIG. 12 shows an arrangement of the conductors of a pathway of a phase for a winding with number of slots Z=24, number of pole pairs p=2, number of phases m=3 (same convention as the preceding figures for the phases) and number of pathways a=4, according to the prior art;

FIG. 13 shows an arrangement of the conductors of all four of the pathways of a winding with number of slots Z=24, number of pole pairs p=2, number of phases m=3 (same convention as the preceding figures for the phases) and number of pathways a=4, according to an example of the prior art;

FIG. 14 shows an arrangement of the conductors of a pathway of a winding with number of slots Z=24, number of pole pairs p=2, number of phases m=3 (same convention as the preceding figures for the phases) and number of pathways a=4, according to an example of the prior art;

FIG. 15 shows an arrangement of the conductors of all four of the pathways of a winding with number of slots Z=24, number of pole pairs p=2, number of phases m=3 (same convention as the preceding figures for the phases) and number of pathways a=4, according to an example of the prior art;

FIG. 16 shows an arrangement of the conductors of a pathway in a winding with number of slots Z=24, number of pole pairs p=2, number of phases m=3 (same convention as the preceding figures for the phases) and number of pathways a=4, according to an aspect of the present description;

FIG. 17 shows an arrangement of the conductors of all four of the pathways of a phase (the other phases are filled similarly) of a winding with number of slots Z=24, number of pole pairs p=2, number of phases m=3 (same convention as the preceding figures for the phases) and number of pathways a=4, according to an aspect of the present description;

FIG. 18 shows an arrangement of conductors of the pathways (the other phases are filled similarly) of a winding phase with number of slots Z=72, number of phases m=3 (same convention as the preceding figures for the phases), number of pole pairs p=6 and number of parallel pathways a=12, wherein the general cell occupied by a pathway is identified by a letter (in this case from A to N), indicating the cardinality of the parallel pathways, followed by a number, relative to the N-th conductor (or semi-coil), according to an aspect of the present description;

FIG. 19 shows an arrangement of conductors of the pathways of a phase (the other pathways are filled similarly) of a winding with number of slots Z=72, number of phases m=3 (same convention as the preceding figures for the phases), number of pole pairs p=6 and number of parallel pathways a=6, wherein the general cell occupied by a pathway is identified by a letter with the same convention as the preceding figures (in this case from A to F) according to an aspect of the present description;

FIG. 20 shows an arrangement of conductors of the pathways of a phase (the other pathways are filled similarly) of a winding with number of slots Z=72, number of phases m=3 (same convention as the preceding figures for the phases), number of pole pairs p=6 and number of parallel pathways a=4, wherein the general cell occupied by a phase is identified by a letter with the same convention as the preceding figures (in this case from A to D) according to an aspect of the present description;

FIG. 21 shows an arrangement of conductors of the pathways of a phase (the other pathways are filled similarly) of a winding with number of slots Z=72, number of phases m=3 (same convention as the preceding figures for the phases), number of pole pairs p=6 and number of parallel pathways a=2, wherein the general cell occupied by a phase is identified by a letter with the same convention as the preceding figures (in this case A and B) according to an aspect of the present description;

FIG. 22 shows an arrangement of conductors of the pathways of a phase (the other pathways are filled similarly) of a winding using "stranded" hairpins with number of slots Z=72, number of phases m=3 (same convention as the preceding figures for the phases), number of pole pairs p=6 and number of parallel pathways a=6, wherein the general cell occupied by a phase is identified by a letter with the same convention as the preceding figures (in this case A-F), where stranded hairpins are used for the layers from 2 to the seventh, according to an aspect of the present description;

FIG. 23 shows an example of a winding pattern with 4 parallel pathways with number of slots Z=36, number of phases m=3 (same convention as the preceding figures for the phases), number of pole pairs p=2 and number of parallel pathways a=4 wherein the general cell occupied by a phase is identified by a letter with the same convention as the preceding figures (in this case A-D), using two types of single-layer hairpins (with pitch k and k+/−3) for each end layer, wherein each phase has three slots per magnetic pole; and FIG. 24 shows an insertion-side view and a perspective view of a winding according to the pattern in FIG. 23.

It should be noted here that elements of different embodiments can be combined together to provide further embodiments without restrictions while respecting the technical concept of the solution of the present description, as those skilled in the art will effortlessly understand from the above description.

Moreover, the present description also makes reference to the prior art for the implementation thereof, as for the detail features, not described, such as elements of minor importance usually used in the prior art in solutions of the same type.

When an element is introduced, it is always understood that there can be "at least one" or "one or more".

When a list of elements or features is listed in this description, it is understood that the finding according to the description "comprises" or alternatively "consists of" such elements.

When listing features within the same sentence or bullet list, one or more of the individual features can be included in the description without connection to the other features on the list.

Hereinafter, the term "hairpin" and the term "basic conductor" will be used interchangeably for the conductors used in the present description.

DETAILED DESCRIPTION OF THE INVENTION

Embodiments

The present description allows eliminating the use of special connections (such as jumpers) in a stator or rotor winding, without modifying the shape of the hairpins forming the general pathway of a phase.

To show this, note that a hairpin generally consists of two legs configured so that, when inserted into the slots according to the pitch thereof, they are positioned in two different layers and mutually adjacent. The single-layer hairpin instead consists of two legs configured to be positioned in slots of the same layer. FIG. 5 shows this situation with the single-layer hairpin 260 inserted into the slots 350 of the stator 300 having the axis 210.

Now, according to the present description, the special connections are eliminated, by means of a specific use of single-layer hairpins in the innermost (proximal) layer and in the outermost (distal) layer. Another effect of the present description is the flexibility, in terms of capacity to vary the number of parallel pathways, and therefore the number of semi-coils or conductors per pathway per phase $$N = \frac{n_l \cdot Z}{m \cdot a}$$

without modifying the shape of the hairpins (except for the use of single-layer ones) and without any repercussions on the process.

By using the present description and, in particular, by exploiting single-layer hairpins with a determined difference in pitch, between the outer (distal) layer and the inner (proximal) layer, which is equal to at least 2, it is possible to obtain an electrically balanced stator or rotor winding according to the above definition. It is noted that in almost all cases jumpers are not used according to the present description. In fact, the only case in which a jumper is required according to the present description is in the case of a configuration with only one pathway in some particular windings (e.g., if the number of slots per pole per phase is 2).

An example according to the present description is the winding with four parallel pathways in FIG. 16, where it is possible to note that:

- In (distal) layer 1, the conductors A7 and A8 occupy the left and right portion of the "standard module", respectively;
- In layer 2, the conductors A1 and A6 occupy the left and right portion of the "standard module", respectively;
- In layer 3, the conductors A2 and A5 occupy the left and right portion of the "standard module", respectively; and
- In (proximal) layer 4, the conductors A3 and A4 occupy the left and right portion of the "standard module", respectively.

This means that the winding is electrically balanced, where a single-layer hairpin 261 is used on the bottom layer (layer 1), which has a pitch longer than two slots with respect to the single-layer hairpin 262 of the highest layer (layer 4). The same reasoning can be made for all four parallel pathways shown in FIG. 17, where there is still a perfectly electrically balanced winding pattern.

In this pattern, as in the others shown in the figures, the phases are grouped into magnetic poles (U, V, W), and within the sphere of each magnetic pole, there is provided a number of adjacent slots, at least equal to the number of phases, respectively. However, this is not necessary to respect the concept of the present description.

According to another example of the present description, shown in FIG. 18, a winding pattern with 8 layers is possible comprising a number of slots Z=72, a number of phases m=3 (wherein the background of the cell is different for different phases, according to the same key in the preceding figures; the same convention is used for the subsequent FIGS. 19-23), a number of pole pairs p=6 (pairs of magnetic poles of the electric machine with opposite polarity) and a number of parallel pathways (of the same phase) a=12. In this exemplary embodiment, the pitch of the innermost single-layer hairpin 262 (layer 1, distal) is 7, while the pitch of the outermost single-layer hairpin (black triangles outside the table) 261 (layer 8, proximal) is 5. In fact, with the same general pattern, the number of pathways can be different, taking the following values, e.g., a=6, a=4, a=2 as in FIGS. 19-21, without varying the shape of the hairpins and without adding/modifying special connections (such as the jumpers, for example), with the sole exception of the configuration with a=1 wherein 1 jumper is required per phase (connection A96-B1 in FIG. 21).

It should be noted that the configuration with a number of parallel pathways a=12 cannot be achieved according to the method of the prior art described in the aforesaid U.S. Pat. No. 10,749,399, i.e., with single-layer hairpins having a difference in pitch of one slot, without compromising the electric balance of the pathways themselves. In fact, with the technique described in such a patent, windings can be balanced which have at most 6 parallel pathways. The present description allows not having predetermined limits to the number of achievable pathways.

To this end, examples are provided in FIGS. 18-21, where the number of pathways varies, but leaving the difference in slots in the pitches of the single-layer hairpins equal to 2 (7 and 5 for the hairpins of the first and last layer, respectively, starting from the top in the tables).

Another example is given in FIG. 19, which shows an arrangement of conductors of the pathways of a phase (the other pathways are filled similarly) of a winding phase with number of slots Z=72, number of phases m=3 (same graphical convention as the preceding figures for the phases), number of pole pairs p=6 and number of parallel pathways a=6, wherein the general cell occupied by a pathway is identified by a letter with the same convention as the preceding figures (in this case from A to F) according to an aspect of the present description. Also in this case, with 6 pathways, there is a perfect electric balance without using jumpers.

Another example is given in FIG. 20, which shows an arrangement of conductors of the pathways of a phase (the other pathways are filled similarly) of a winding with number of slots Z=72, number of phases m=3 (same graphical convention as the preceding figures for the phases), number of pole pairs p=6 and number of parallel pathways a=4, wherein the general cell occupied by a phase is identified by a letter with the same convention as the preceding figures (in this case from A to D) according to an aspect of the present description. Also in this case, with 4 pathways, there is a perfect electric balance without using jumpers.

A different example is that in FIG. 21, which shows an arrangement of conductors of the pathways of a phase (the other pathways are filled similarly) of a winding with number of slots Z=72, number of phases m=3 (same graphical convention as the preceding figures for the phases), number of pole pairs p=6 and number of parallel pathways a=2, wherein the general cell occupied by a phase is identified by a letter with the same convention as the preceding figures (in this case A and B) according to an aspect of the present description. Also in this case, with 2 pathways, there is a perfect electric balance without using jumpers.

A further different example is that in FIG. 22, which shows an arrangement of conductors of the pathways of a phase (the other pathways are filled similarly) of a winding using "stranded" hairpins with number of slots Z=72, number of phases m=3 (same graphical convention as the preceding figures for the phases), number of pole pairs p=6 and number of parallel pathways a=6, wherein the general cell occupied by a phase is identified by a letter with the same convention as the preceding figures (in this case A-F), according to an aspect of the present description, where stranded hairpins are used for the layers from 2 to the seventh. Also in this case, with 6 pathways and a difference in pitch equal to 2 for the single-layer hairpins, there is a perfect electric balance without using jumpers.

One last example is that in FIG. 23, which shows an example of a winding pattern with 4 parallel pathways with number of slots Z=36, number of phases m=3 (same convention as the preceding figures for the phases), number of pole pairs p=2 and number of parallel pathways a=4 wherein the general cell occupied by a phase is identified by a letter with the same convention as the preceding figures (in this case from A to D), using two types of single-layer hairpins (with pitch k and k+/−3) for each end layer. Also in this case, with 4 pathways and a difference in pitch equal to 3 for the single-layer hairpins, there is a perfect electric balance between the pathways without using jumpers. Note that in this case the standard hairpins all have the same pitch (in this particular case pitch 9); the single-layer hairpins have instead pitches 7 and 10 (k+/−3), respectively, for both end layers. The single-path configuration is obtained by carrying out the weldings A12-B1, B12-C1 and C12-D1 on the welding side of the winding. On the other hand, the configuration with two parallel paths is obtained by carrying out the weldings A12-B1 and C12-D1.

As seen above, according to an aspect of the present description, it is generally possible to provide a stator winding which uses single-layer hairpins with a difference in pitch with the other single-layer hairpins present, equal number of slots>1 (counting from the next slot up to and including the arrival one), where the aforesaid "stranded hairpins", not present in the aforesaid patent, are also used in the winding.

FIG. 24 shows an insertion side view and a perspective view of a winding 220 in a drum or stator 230 with axis 210 according to the pattern in FIG. 23, where the hairpins of a general phase have a graphical filling shown in the key. In particular, those in the U phase are also indicated by reference numeral 261, those in the V phase by reference numeral 262, and those in the W phase by reference numeral 263.

According to an aspect of present the description, it is possible to have several types of single-layer hairpins on one or both end layers (distal and proximal), as can be seen, for example, in FIG. 23 (in an end layer, note that there are two types of single-layer hairpins in terms of pitch) and in FIG. 24, where there are three different types of single-layer hairpins in terms of geometries, and two in terms of pitch.

According to a different aspect of the present description, in the winding 220 at least one of the single-layer basic conductors 261-263, located on the innermost (proximal) layer or on the outermost (distal) layer of the winding, have the two free ends (twisting side) angled in opposite circumferential directions so as to prepare the winding for the so-called "backtwisting", so that some wires of the crown are bent in the opposite direction to the standard twisting direction, in order to move some standard connections/weldings.

The above is applicable in windings with at least one distal layer and at least one proximal layer, advantageously in windings also comprising one or more intermediate layers between the distal layer and the proximal layer, in particular at least two intermediate layers.

Finally, the windings of the present invention cannot contain any jumpers.

The illustrative patterns shown above can be considered as describing stator or rotor windings beyond the stator or rotor (e.g., after the pre-assembly thereof) or in the stator or rotor (after transferring the winding to the stator or rotor), irrespective of whether all the weldings of the welding side have been carried out. Stranded hairpins, I-pins, nested hairpins, and reverse hairpins are usable as single-layer hairpins or standard hairpins as described above.

ADVANTAGES

With respect to U.S. Pat. No. 10,749,399, one solution of the present description comprises the following innovative features:

- in the aforesaid patent the difference in pitch between the inner/outer single-layer hairpins and the outer/inner single-layer hairpins is equal to 1; in the present description the difference in pitch between the single hairpins is >1;
- in the aforesaid Riedl's patent, the pitch of the hairpins in one of the two single layers (inner or outer, the widest one) must be equal to the pitch of the standard winding hairpins (those belonging to the central crowns of the stator winding); this limitation is not present in the present description;
- in the aforesaid patent, it is not possible to have nested single-layer hairpins; the present description can comprise instead nested single-layer hairpins inside a stator winding;
- in the aforesaid patent, it is not possible to have "stranded hairpins"; the present description can comprise the use of "stranded hairpins" inside the winding; and
- with the mentioned Riedl's patent, it is not possible to achieve the maximum number of parallel pathways while ensuring the electric balance between the pathways themselves (e.g., 16 parallel pathways are not possible for the pattern in FIGS. 8 and 9 of the known patent).

Again with respect to U.S. Pat. No. 10,749,399, the present description offers the following advantages:

- Greater flexibility, by virtue of the high number of parallel pathways achievable, without compromising the electric balance thereof; and
- Simplification of the manufacturing process: in fact, it is possible to obtain a family of stators, maintaining the diameter at the air gap, the number of slots, and the dimensions of the conductor, with a different number of parallel pathways, without the electric balance between the pathways, with minimum impact on the production process.

In the solution according to the present description, nested single-layer hairpins can be used since the pitch varies by at least +/−2 (but also 3, 4, 5, 6 and so on without limitation) with respect to the other underlying or overlying layer.

Preferred embodiments have been described above and variants of the present description have been suggested, but it is understood that those skilled in the art may make modifications and changes without departing from the related scope of protection, as defined by the appended claims.

The invention claimed is:

1. A polyphase bar stator or rotor winding, comprising two or more layers of basic conductors, the basic conductors comprising a head end connecting two legs, each leg having a corresponding free end, each layer consisting of a circumferential arrangement of the basic conductors wound about a central winding axis, a distal layer and a proximal layer being defined with respect to said winding axis, wherein the legs of the basic conductors cross predetermined volume units which are circumferentially adjacent in each layer and radially corresponding between layers to form a radial series of volume units, an angular distance covered by each basic conductor with respect to said winding axis being measured in terms of a number of volume units circumferentially covered between said two legs and being referred to as pitch, wherein:

- the head ends of the basic conductors are all on a first side with respect to a direction of the winding axis and the free ends are all on a side opposite to said first side;
- the basic conductors are electrically connected from said side opposite to the first side to form a plurality of single-phase pathways;
- the polyphase bar stator or rotor winding comprises a plurality of single-layer basic conductors configured so that the two legs thereof are positioned in the volume units of a same layer; and
- at least one of the pathways of said plurality of single-phase pathways comprises one or more distal single-layer basic conductors positioned in the distal layer and having a first pitch, and one or more respective proximal single-layer basic conductors positioned in the proximal layer and having a second pitch; and wherein said first pitch and said second pitch differ by two or more volume units.

2. The polyphase bar stator or rotor winding of claim 1, wherein said first pitch and said second pitch differ by two volume units.

3. The polyphase bar stator or rotor winding of claim 1, wherein said first pitch and said second pitch differ by three volume units.

4. The polyphase bar stator or rotor winding of claim 1, wherein all the pathways of the plurality of single-phase pathways comprise one or more distal single-layer basic conductors with a first pitch and one or more proximal single-layer basic conductors with a second pitch.

5. The polyphase bar stator or rotor winding of claim 1, wherein said basic conductors comprise nested basic conductors.

6. The polyphase bar stator or rotor winding of claim 1, wherein said basic conductors comprise stranded basic conductors.

7. The polyphase bar stator or rotor winding of claim 1, wherein at least one of the one or more distal single-layer basic conductors and/or at least one of the one or more proximal single-layer basic conductors have the two free ends angled in opposite circumferential directions.

8. The polyphase bar stator or rotor winding of claim 1, wherein at least one of the basic conductors other than the single-layer basic conductors has a pitch corresponding to one of said first and second pitches.

9. The polyphase bar stator or rotor winding of claim 1, wherein at least one intermediate layer is interposed between said distal layer and said proximal layer.

10. The polyphase bar stator or rotor winding of claim 1, wherein the polyphase bar stator or rotor winding is devoid of jumpers.

11. A stator or rotor for an electric machine, comprising a core with a series of slots and at least one winding of conductors inserted into said slots, wherein said at least one winding of conductors is the polyphase bar stator or rotor winding of claim 1.

12. An electric machine comprising the stator or rotor of claim 11.

* * * * *